(12) United States Patent
Kutaragi et al.

(10) Patent No.: US 7,275,261 B2
(45) Date of Patent: Sep. 25, 2007

(54) METHOD AND SYSTEM FOR MONITORING UTILIZING CONDITION OF CONTENTS, COMPUTER PROGRAM AND RECORDING MEDIUM

(75) Inventors: Ken Kutaragi, Kanagawa (JP); Shinichi Okamoto, Tokyo (JP); Keiso Shimakawa, Kanagawa (JP); Toyoshi Okada, Tokyo (JP); Muneki Shimada, Tokyo (JP); Minoru Hashimoto, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 630 days.

(21) Appl. No.: 09/942,977

(22) Filed: Aug. 30, 2001

(65) Prior Publication Data

US 2002/0035688 A1    Mar. 21, 2002

(30) Foreign Application Priority Data

Sep. 1, 2000    (JP)    ............................. 2000-266154
Aug. 30, 2001    (JP)    ............................. 2001-261723

(51) Int. Cl.
*G06F 17/30*    (2006.01)
*G06F 17/00*    (2006.01)

(52) U.S. Cl. ............................. 726/26; 705/51; 707/10
(58) Field of Classification Search ................ 713/151, 713/152, 153, 154, 164, 165, 166, 167; 380/259, 380/278, 283; 726/26
See application file for complete search history.

(56) References Cited

U.S. PATENT DOCUMENTS 5,634,012 A * 5/1997 Stefik et al. ................... 705/39
5,673,315 A * 9/1997 Wolf ............................. 705/59
5,892,900 A * 4/1999 Ginter et al. ................. 713/200
5,978,484 A * 11/1999 Apperson et al. ............. 705/54
6,006,332 A * 12/1999 Rabne et al. ................ 713/201
6,389,403 B1 * 5/2002 Dorak, Jr. ..................... 705/52

FOREIGN PATENT DOCUMENTS

| JP | 0 837 383 | 4/1998 |
|---|---|---|
| JP | 10-154184 | 6/1998 |
| JP | 10-154185 | 6/1998 |
| JP | 10-274928 | 10/1998 |
| JP | 0 884 669 | 12/1998 |
| JP | 11-7241 | 1/1999 |
| JP | 11-328850 | 11/1999 |
| JP | 0 996 074 | 4/2000 |
| JP | 2000-163488 | 6/2000 |
| JP | 2000-181963 | 6/2000 |
| JP | 2000-236529 | 8/2000 |

\* cited by examiner

*Primary Examiner*—Kambiz Zand
*Assistant Examiner*—Matthew Heneghan
(74) *Attorney, Agent, or Firm*—Katten Muchin Rosenman LLP (57) ABSTRACT

In a contents distributing system, a monitoring server is equipped on a network with which all user terminals being capable of utilizing contents are allowed to connect, and a member card is issued to a user operating the user terminal. In the contents distributed from an information service server, a middleware for storing a history of utilizing contents (log data etc.) to the member card and for transmitting this history of utilizing contents along with a user ID to the monitoring server is embedded. The monitoring server generates utilization information indicating how much the particular contents are utilized by the user, based on the collected history of utilizing contents and the collected user ID.

9 Claims, 6 Drawing Sheets

(a)
SendMsgICCard_t * msg);

(b)
```
typedef struct {          CONTENTS ID
    int content_id ;      MESSAGE TYPE
    int msg_type ;
} Contentmsg_t ;
```

FIG. 6

(a)
```
typedef struct {                  TOTAL PACKET SIZE
    int packet_size ;             HEADER SIZE
    int content_header_size ;
    int content_id ;
    int msg_type;
    ............
} Contentmsg_t ;
```

METHOD AND SYSTEM FOR MONITORING UTILIZING CONDITION OF CONTENTS, COMPUTER PROGRAM AND RECORDING MEDIUM

CROSS-REFERENCE TO RELATED APPLICATIONS

This application is based upon and claims the benefit of priorities from the prior Japanese Patent Applications No. 2000-266154 filed on Sep. 1, 2000 and No. 2001-261723 filed on Aug. 30, 2001, the entire contents of both of which are incorporated herein by reference.

BACKGROUND OF THE INVENTION

1. Field of the Invention

The present invention relates to a technique for distributing contents which includes, for example, game programs, video signals, image data, sound data, music data, character information or the composition of them.

2. Description of the Related Art

Along with the popularization of the internet, distributing contents to numbers of people is becoming easier. Recently, pay services of distributing contents are implemented actively. However, in the wide-area network like the internet to which general public people can access, piracy and interception of contents arises easily, thus security and copyright of contents cannot be fully protected.

Moreover, when the contents is distributed using pay service, it is difficult to set charge fee properly, because it is hard to figure out how much the paid contents is utilized.

To solve such problems, the techniques for distributing contents were conventionally proposed, which are described below.

(1) Data Communication System (Japan Laid-Open Patent Publication No. 2000-181963: "First Prior Art")

In this system, an information recording medium storing a data communication program is sold. User buys this information recording medium, and install the data communication program to the user's PC (Personal Computer) to run this program. After that, the communication line between the user's PC and the apparatus holding pay contents is automatically established, and user can obtain any contents through this communication line by request. Thus, distributing pay contents with the security of the contents being maintained can be achieved in a simple manner. Additionally, charging operation etc. can be easily managed.

(2) Information Distributing System (Japan Laid-Open Patent Publication No.11-328850: "Second Prior Art")

In this system, a first encryption key and contents encrypted using the first encryption key are transmitted from a server to a user terminal (user machine). At the user terminal side, the encrypted contents are decrypted using the first encryption key. At the same time, charging operation of the contents is executed. Furthermore, a code which varied dynamically along with the elapsed time (DA code) is accompanied with the first encryption key. Therefore, it is possible to prevent the incorrect use of contents and to put a predetermined restriction on the use of contents.

(3) System for managing digital contents utilizing digital watermark (Japan Laid-Open Patent Publication No.11-7241: "Third Prior Art")

In this system, a contents management program is installed to an OS (Operating System) of a user terminal (user machine) and a monitoring program etc. is transmitted from a contents distribution side to the user terminal via a network to monitor utilizing condition of contents. A digital watermark is embedded in the contents, so that when the contents are used incorrectly, utilizing contents is restricted hereafter. And because the invisible digital watermark is embedded in the contents, routes of copying, forwarding contents etc. can be confirmed even if the contents is utilized correctly.

According to these prior arts described above, security of contents themselves is maintained to a certain level, and utilizing condition of contents can be figured out. And, both of the first and second prior arts have an advantage of clarifying charging system.

However, according to the first prior art, the information recording medium per each content is needed to be prepared and sold, and according to the second prior art, managing DA code is bothersome. Consequently, in the first and second prior arts, the problem remains such that these prior arts cause inflation of costs. Additionally, according to the first prior art, one can monitor the utilizing condition of contents only when the contents is distributed.

According to the third prior art, one can monitor the utilizing condition of contents dynamically. However, because the contents management program is installed to the OS of the user terminal, the versatility of the operation of the user terminal may be spoiled. Additionally, the third prior art has a disadvantage that the monitoring program etc. per each kind of contents is needed to be prepared, and that the prepared monitoring program must be transmitted to the distributing destination which is to be identified whenever the program is transmitted.

The ways of distributing contents become more diverse, and contents itself may be created in a wide variety such as program, data and so on. Therefore, it is difficult to monitor the utilizing condition of contents using the conventional uniform technique.

On the other hand, it is reasonable that the contents provider should install the system of monitoring the utilizing condition of contents separately corresponding to demand of the contents.

Therefore, it is a main object of the present invention to provide a system in which the utilizing condition of contents to be distributed can be monitored properly, permanently and at a low cost.

SUMMARY OF THE INVENTION

According to one aspect of the present invention, there is provided a first method for monitoring utilization condition of contents, the method comprising the steps of equipping information gathering means, such as a server for gathering information, on a network with which a user terminal is allowed to connect, the user terminal carrying out information processing by utilizing the contents; distributing digital information embedded in the contents to the user terminal, the digital information causing the user terminal to transmit a contents utilizing history indicating the utilizing condition of the contents to the information gathering means at a predetermined timing while the user terminal is connected with the network; and creating utilizing information indicating how much the particular content is utilized, based on the contents utilizing history collected through the information gathering means.

The "digital information" is, for example, a program which is read out by the user terminal and executes processes according to the procedure described above, a call data capable of executing processes according to the procedure described above by recalling a particular function of an OS (Operating System), etc. and is embedded in an area which does not cause any problem in utilizing the contents. The digital information may be prepared separately in correspondence with the type of the contents, and usually, may be changed ad hoc in correspondence with a demand for the contents at the time of preparing the contents.

According to another aspect of the present invention, there is provided a second method for monitoring utilization condition of contents, the method further comprising the step of issuing a recording medium to a user operating a user terminal which carries out information processing by utilizing the contents, the recording medium having a data recording area for recording user identification data and a nonvolatile memory area in itself, in addition to the first method for monitoring utilization condition of contents. The user identification data is for identifying a pre-registered user uniquely.

Further, the second method differs from the first method in distributing digital information embedded in the contents to the user terminal to which the issued recording medium is loaded, the digital information causing the user terminal to store a contents utilizing history indicating the utilizing condition of the contents to the memory area, and to read the stored contents utilizing history so as to transmit the contents utilizing history to the information gathering means along with the user identification data at a predetermined timing while the user terminal is connected with the network; and creating utilizing information indicating how much the particular content is utilized by which user, based on the contents utilizing history and the user identification data collected through the information gathering means.

According to the second method of monitoring utilizing condition of contents, since it is possible to identify the user operating the user terminal, it is possible to analyze the interest of the user and to process charging etc. by compiling the history of utilizing contents.

In light of protecting the copyright, the second method of monitoring utilization of contents further comprises the step of authenticating whether the user terminal and the contents utilized in the user terminal are proper or not, based on a registered history data of transaction indicating that the content are properly transacted, and also based on a registered user terminal identification data for authentication.

It may be arranged that the authenticating step is executed on the user terminal to which the recording medium is loaded, by recording the user terminal identification data to the data recording area of the recording medium and distributing the history data of transaction along with the contents.

According to another aspect of the present invention, there is provided a first system for monitoring utilization condition of contents, the system comprising information gathering means for gathering information from a network with which a user terminal is allowed to connect, the user terminal carrying out information processing by utilizing the contents; contents distributing means for distributing digital information embedded in the contents to the user terminal, the digital information causing the user terminal to transmit a contents utilizing history indicating the utilizing condition of the contents to the information gathering means at a predetermined timing while the user terminal is connected with the network; and utilizing information creating means for creating utilizing information indicating how much the particular content is utilized, based on the contents utilizing history collected through the information gathering means.

According to another aspect of the present invention, there is provided a second system for monitoring utilization condition of contents comprising means for issuing a recording medium to a user operating a user terminal which carries out information processing by utilizing the contents, the recording medium having a data recording area for recording user identification data and a nonvolatile memory area; information gathering means for gathering information from a network with which the user terminal is allowed to connect; contents distributing means for distributing digital information embedded in the contents to the user terminal to which the issued recording medium is loaded, the digital information causing the user terminal to store a contents utilizing history indicating the utilizing condition of the contents to the memory area, and to read the stored contents utilizing history so as to transmit the contents utilizing history to the information gathering means along with the user identification data at a predetermined timing while the user terminal is connected with the network; and utilizing information creating means for creating utilizing information indicating how much the particular content is utilized by which user, based on the contents utilizing history and the user identification data collected through the information gathering means.

According to another aspect of the present invention, there is provided a first computer program for causing a computer system (a single computer or a plurality of distributed systems) connectable to a network with which a user terminal for executing information processing by utilizing contents is allowed to connect, to operate as a utilizing condition monitoring system for monitoring utilizing condition of the contents by the user terminal, the computer program causing the utilizing condition monitoring system to comprise information gathering means, such as a hardware element for information gathering operable by software, for gathering information from the network; contents distributing means for distributing digital information embedded in the contents to the user terminal, the digital information causing the user terminal to transmit a contents utilizing history indicating the utilizing condition of the contents to the information gathering means at a predetermined timing while the user terminal is connected with the network; and utilizing information creating means for creating utilizing information indicating how much the particular content is utilized, based on the contents utilizing history collected through the information gathering means.

According to another aspect of the present invention, there is provided a second computer program for causing a computer system connectable to a network with which a user terminal is allowed to connect, to operate as a utilizing condition monitoring system for monitoring utilizing condition of contents by the user terminal, the user terminal loaded with a recording medium having a data recording area for recording user identification data for identifying a user operating the user terminal and a nonvolatile memory area so as to execute information processing by utilizing the contents, the computer program causing the utilizing condition monitoring system to comprise information gathering means for gathering information from the network; contents distributing means for distributing digital information embedded in the contents to the user terminal, the digital information causing the user terminal to store a contents utilizing history indicating the utilizing condition of the contents to the memory area, and to read the stored contents utilizing history so as to transmit the contents utilizing history to the information gathering means along with the user identification data at a predetermined timing while the user terminal is connected with the network; and utilizing information creating means for creating utilizing information indicating how much the particular content is utilized by which user, based on the contents utilizing history and the user identification data collected through the information gathering means.

It may be arranged that the foregoing first or second computer program is recorded in a computer-readable recording medium such as a CD-ROM, DVD-ROM or semiconductor memory.

According to another aspect of the present invention, there are provided a first recording medium which holds the contents to be readable by the user terminal, and a second recording medium comprising an authentication mechanism.

The first recording medium is a recording medium readable by a user terminal which executes information processing by utilizing contents and is accessible to information gathering means equipped on a network, the recording medium comprising a contents recording area in which the contents are recorded and a digital information recording area in which digital information associated with the contents is recorded, wherein the digital information causes the user terminal to store a contents utilizing history indicating utilizing condition of the contents in a given recording area of the recording medium, and to read the stored contents utilizing history so as to transmit the contents utilizing history to the information gathering means at a predetermined timing while the user terminal is connected with the network.

In the case of focusing on the validity of utilizing the contents, a transaction history recording area for recording transaction history data indicating that the contents are properly transacted, may be provided at a position accessible by the user terminal prior to at least the contents recording area.

The second recording medium is a recording medium detachably loaded in a user terminal which executes information processing by utilizing contents and is accessible to information gathering means equipped on a network, the recording medium comprising:

authentication means; a data recording area for recording pre-registered user identification data, user terminal identification data for identifying the user terminal allowed to be used properly, and key data indispensable for utilizing the contents; a rewritable nonvolatile memory area; and memory control means for causing the user terminal authenticated by the authentication means to store a contents utilizing history indicating utilizing condition of the contents to the memory area, and to read the stored contents utilizing history so as to transmit the contents utilizing history to the information gathering means along with the user identification data at a predetermined timing while the user terminal is connected with the network.

BRIEF DESCRIPTION OF THE DRAWINGS

The present invention will be understood more fully from the detailed description given hereinbelow, taken in conjunction with the accompanying drawings.

In FIG. 7, (a) is a diagram showing a parameter which is an example of a header in the case that a tag is included in a data packet of the contents, and (b) is a diagram showing a relationship between the contents and the tag.

DESCRIPTION OF THE PREFERRED EMBODIMENT

Now, a contents distributing system according to a preferred embodiment of the present invention will be described with reference to the accompanying drawings.

Figure 1:
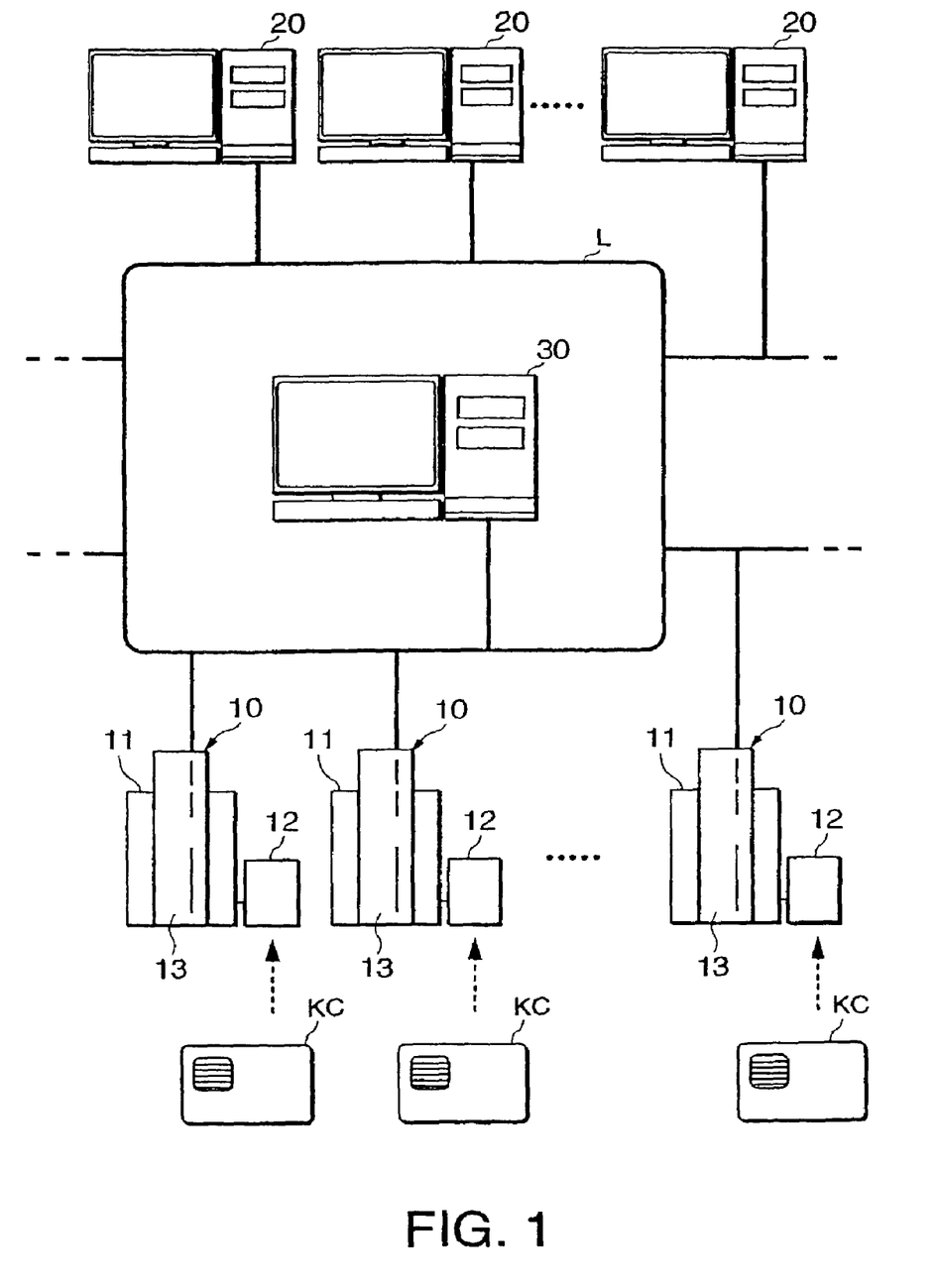
FIG. 1 is a block diagram showing an overall structure of the contents distributing system in which the present invention is applied.

FIG. 1 is a block diagram showing an overall structure of the contents distributing system in which the present invention is applied.

In this contents distributing system, information service servers 20 distribute contents to user terminals 10 each of which is connected to an internet L. A monitoring server 30, which is an example of a system for monitoring utilizing condition of contents according to the present invention, monitors the utilizing condition of the contents, and the monitoring results is provided as a pay service to a contents distributor (a licensee of a contents management infrastructure) which manages the information service servers 20.

In this embodiment, only a member user can enjoy the advantage derived from utilization of contents; in other words, only the user which is registered in the monitoring server 30 and receives an issued member card KC comprised of a card with an IC chip can utilize the contents. The member card KC is issued by a card issuing apparatus equipped by a service manager, usually a managing agency of the monitoring server 30.

<User Terminal>

The user terminal 10 comprises a local storage device 11 which includes a hard-disk drive (HDD), a card control mechanism 12 which is detachably mounted with the member card KC and controls recording of information to the member card KC and reading of information recorded in the member card KC, and a main control portion 13 which carries out a required information processing utilizing the information recorded in the member card KC and the contents distributed by the information service server 20. Furthermore, the user terminal 10 is connected with a display device which is not shown in the drawings.

In this user terminal 10, the contents are activated only when the member card KC is mounted on the user terminal 10. In the case that the contents is a program, the program is decoded partially after installation of the program, and the member card KC is necessary for startup of the program.

The card control mechanism 12 is a card reader/writer in the case that the member card is a card equipped with an IC chip (a contact/non-contact type IC card, a hybrid type IC card etc.), and in the case that the member card is a memory card, the card control mechanism 12 is a control mechanism of the memory card.

The main control portion 13 performs authentication process, information recording/reading-out, and process for information transmission.

An entertainment device (PS2 etc.) which is equipped with a communication function and is supplied by Sony Computer Entertainment Inc. (Japan) is connected with a hard-disk (and/or a memory card) and a display device, and as a result of that, the entertainment device can be utilized as the above-mentioned user terminal 10. In the case that a card equipped with an IC chip is utilized as the member card KC, the entertainment device is connected with a card reader/writer.

<Information Service Server>

Figure 2:
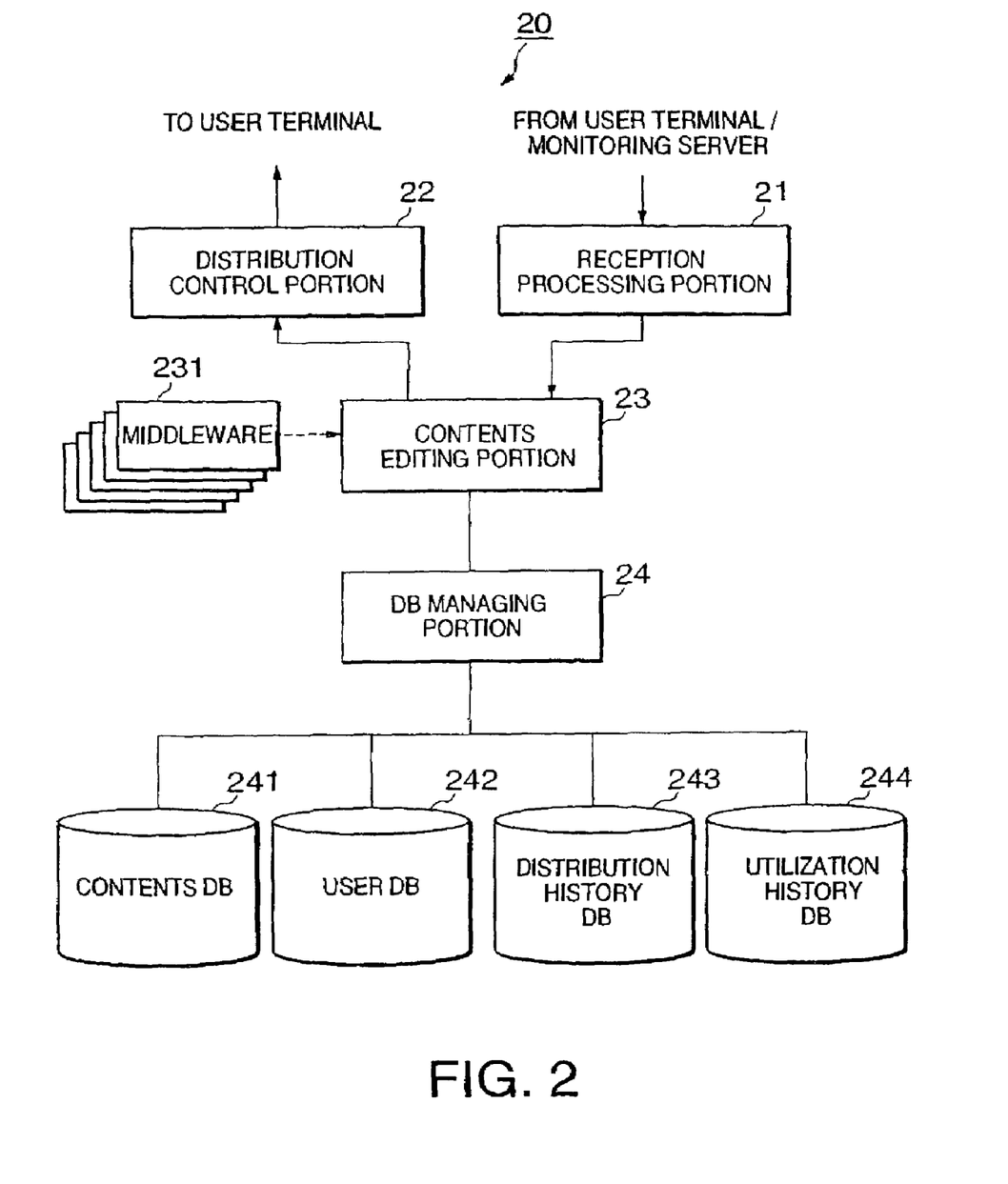
FIG. 2 is a functional block diagram of an information service server according to the preferred embodiment of the present invention.

As shown in FIG. 2, the information service server 20 comprises a reception processing portion 21, a distribution control portion 22 which distributes contents to the user terminal 10 of the user who desires the contents to be distributed, a contents editing portion 23 which processes and edits the contents intended for distribution, a contents DB 241 (DB is the abbreviation for a database, and hereafter the database is referred to as "DB") in which the contents is stored, an user DB 242 in which user information is stored, an user distribution history DB 243 in which a history of contents distribution to users is stored, an utilization history DB 244 in which a history of utilization of contents distributed from the monitoring server 30, and DB managing portion 24 which primary controls recording data to these DB 241-244 and reading data from these DB 241-244.

The reception processing portion 21 receives a demand for contents from the user terminal 10, the contents from the monitoring server 30, information for utilizing contents, and so on. The distribution control portion 22 distributes contents to each user terminal 10. In the case that the distribution control portion 22 distributes contents to user terminal, the distribution control portion 22 notify the monitoring server 30 of the information of distribution of contents.

<Monitoring Server>

The monitoring server 30 is a server which centrally controls all information with respect to contents distribution, and is realized by cooperation of a server body as an example of a computer system and a computer program read and executed by the server body. The computer program may be recorded in a CD-ROM, DVD-ROM, semiconductor memory or other recording medium, or may be loaded into a storage device of the server body via the internet L.

The server body has a function of two-way communication toward all information processing device and communication device (including user terminal 10) connected with the internet L. Furthermore, the monitoring server 30 is connected with a card issuing device which issues the member card KC for managing the member user. The card issuing device has a function of sending/receiving data in conjunction with a user master described after.

The contents to be delivered can be created in the monitoring server 30, or can be processed (compressed to an archive, encrypted) after receiving the contents from a contents creator ad libitum. In the case that the contents is created in a place other than the monitoring server 30 and delivered to the monitoring server 30, this monitoring server 30 manages the contents under receiving a notification of a detail of the contents.

From now on, the simplest example in which the contents is processed and edited on the side of the information service server 20, and the monitoring server 30 receives a notification of a detail of the contents will be described.

Figure 3:
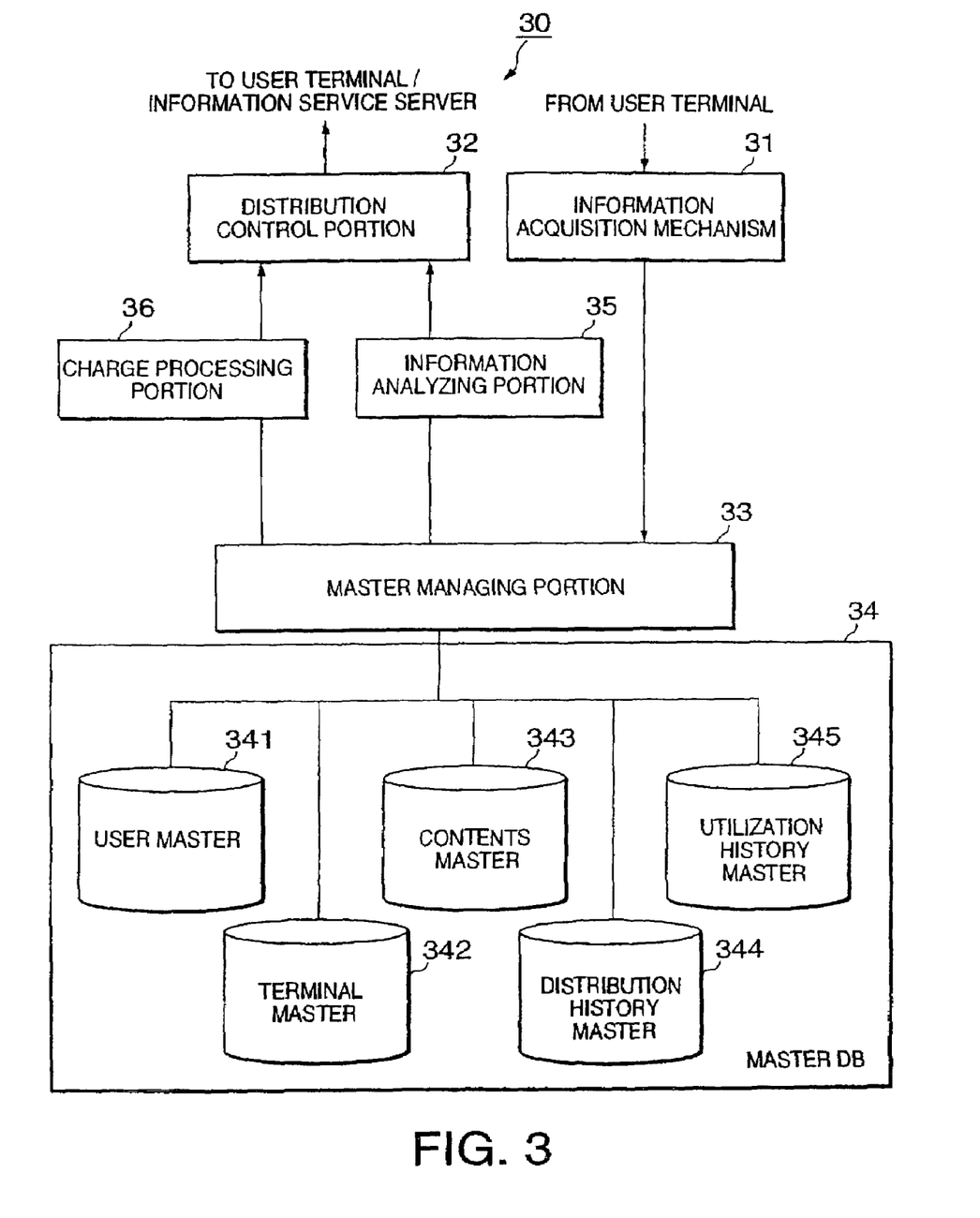
FIG. 3 is a functional block diagram of a monitoring server according to the preferred embodiment-of the present invention.

In this embodiment, functions or mechanisms as shown in FIG. 3 are created through execution of the computer program by the server body. Specifically, there are created an information acquisition mechanism 31 which acquires a history of distribution of all contents which are delivered from the information service server 20 to the user (history data of transaction which indicates that contents is dealt properly) and acquires a history of utilization of contents which indicates utilizing condition of contents, a distribution control portion 32 which controls distribution of information such as contents etc. toward the user terminal 10 and information service server 20, a master managing portion 33 which manages master DB 34, an information analyzing portion 35 which analyzes information recorded in the master DB 34, and a charge processing portion 36 which processes charging to a manager of the information service server 20 or a user handling the user terminal 10 on the basis of the information recorded in the master DB 34. The information acquisition mechanism 31 serves as an interface between the internet L and the server body and is realized by cooperation with a hardware element such as a communication port. The information acquisition mechanism 31 may be replaced with an independent server (information acquisition server) which is operable by a computer program.

The master DB 34 comprises a user master 341, a terminal master 342, a contents master 343, a distribution history master 344, and a utilization history master 345.

In the user master 341, personal information of each user registered as member users is recorded in correspondence with a user ID as a user identification data. Information regarding action of the user is added if needed.

In the terminal master 342, a serial number of the user terminal of a registered user etc. is recorded in correspondence with a terminal ID as a terminal identification data and the user ID.

In the contents master 343, each contents identification data (contents ID) distributed from the information service server 20 is recorded in correspondence with the user ID and/or the terminal ID. Moreover, the contents master 343 includes a charging rule table in which a charging rule for utilization of contents is recorded.

In the distribution history master 344, each gathered distribution history is recorded in correspondence with the content ID and/or the user ID.

In the utilization history master 345, each gathered history of utilizing contents is recorded in correspondence with the contents ID and/or the user ID.

The information analyzing portion 35 carries out various kinds of analysis based on the recorded contents of all DB recorded in the master DB 34. For example, the information analyzing portion 35 analyzes how much the particular contents is utilized by one user, based on the history of the utilization of contents per each contents recorded in the utilization history master 345, and generates utilization information per each contents. And, if it is not necessary to identify user's personal information, for example, it is sufficient only to identify times of utilization of contents, the information analyzing portion 35 generates the utilization information regarding the times of utilization of contents.

Furthermore, the information analyzing portion 35 can analyze how much the particular contents are utilized by one user's age bracket, based on the user's personal information.

A result of analysis by the information analyzing portion 35 is distributed on-line (via the information service server 30 and/or the user terminal 10) or off-line (by mail etc.) to the contents creator, the contents distributor, and the users.

The charge processing portion 36 generates the first charge information for the user and the second charge information for the contents distributor, based on the distribution history and the history of utilization of the contents, and with reference to the charging rule table in the contents master 343.

<Member Card>

Figure 4:
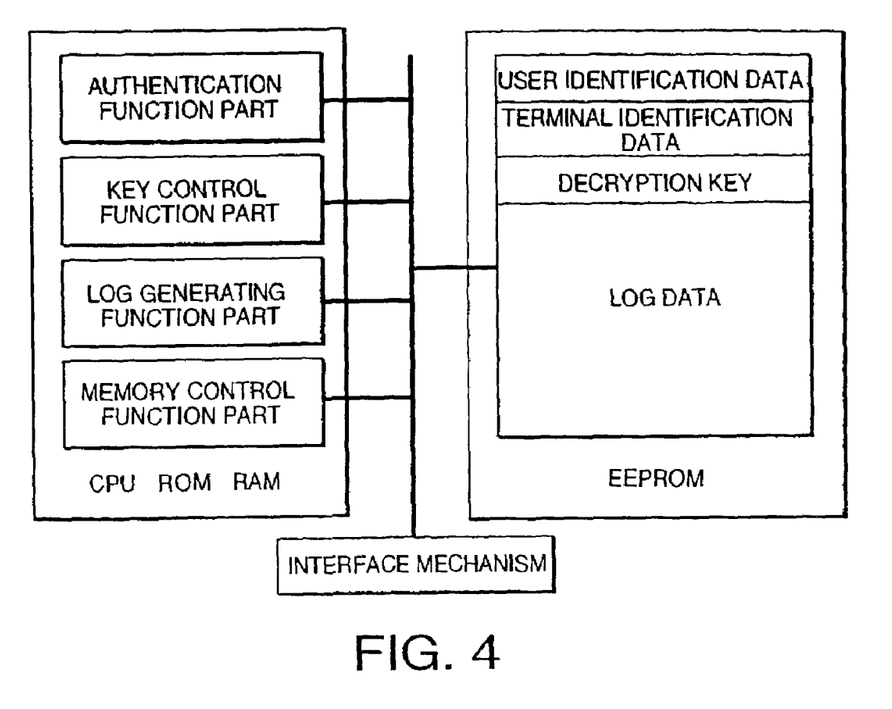
FIG. 4 is a functional block diagram of a member card (IC card) according to the preferred embodiment of the present invention.

FIG. 4 is a block diagram of the functional structure of the member card KC in the case that IC card is used as the member card KC.

This member card KC is constructed by both of an interface mechanism for connecting with the card reader/writer 12 provided on the side of user terminal 10 and IC chip equipped in a card-form medium of a standard size.

The IC chip is connected with a CPU (Central Processing Unit), a ROM (Read Only Memory), a RAM (Random Access Memory), and an EEPROM (Electrically Erasable Programmable Read Only Memory) via an internal bus. In the EEPROM, a key area for recording a decryption key, a data recording area for recording the user ID as the user identification data, the terminal ID as the user terminal identification data, and a data indicating that the contents is dealt properly etc., a log area for storing a log data as one of the history of utilization of contents are generated.

However, the log data is only an example, and the history of utilization of contents other than the log data is recorded in the EEPROM.

By executing a program recorded in the ROM, an authentication function part, a key control function part, log generating function part and a memory control function part are generated in the CPU.

The member card KC is used for authenticating the user terminal 10 and for authenticating whether the contents utilized in this user terminal 10 is proper or not. Moreover, the member card KC stores the log data indicating the condition of utilization of contents, based on an instruction of the contents side. While the user terminal 10 is connected with the internet L, the stored log data is automatically read out and is transmitted to the monitoring server 30 along with the user identification data and the terminal identification data.

<Operation Mode>

Next, an operation mode of the contents distributing system described above will be explained.

Figure 5:
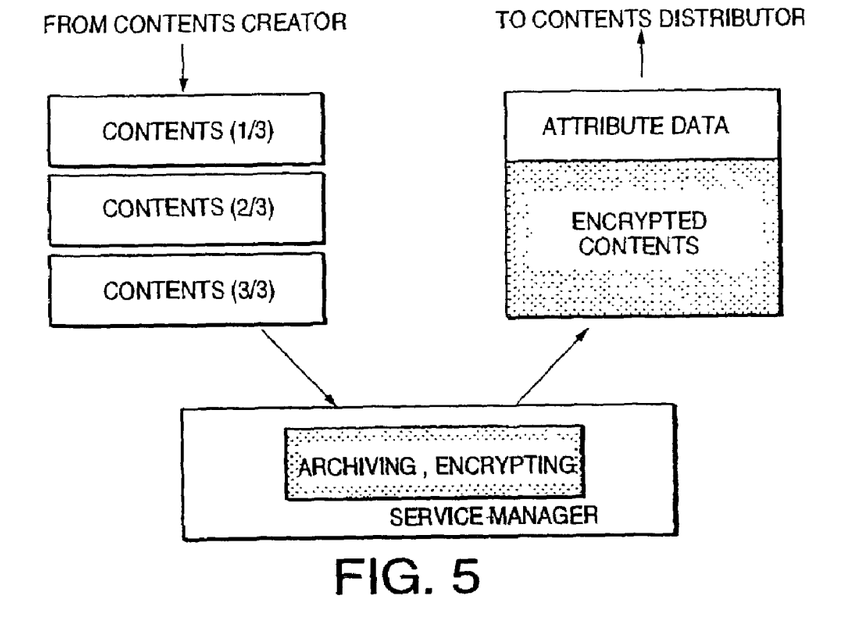
FIG. 5 is a diagram showing a treatment of the contents according to the preferred embodiment of the present invention.

In this embodiment, as shown in FIG. 5, a plurality of contents created by the contents creator is processed to one archive data (digital archive) and the one archive data is encrypted. After that, the encrypted data is distributed toward the user after adding an attribute data (property) in the encrypted data.

The attribute data indicates the attribute of the particular contents most clearly. A genre of the contents (sports, movie, education etc.), a type of the contents (image, music, program etc.), a distribution mode of the contents (free, pay, time-limited etc.), and a condition of transaction (day of transaction, transacting user's name or user's ID) give good examples of the attribute data.

This attribute data is described using a self-definable language such as XML (eXtensible Markup Language). On this account, it is significantly easy to append new information to the attribute data.

The key used in the process of encryption and a corresponding decryption key are issued by the service manager, and passed to the user after recorded in the member card KC. These keys are recorded in the user master 341 of the monitoring server 30.

Digital information is embedded in each contents so that information on a transaction process of the contents, situation of operation generated at the time of utilization of the contents at the user terminal 10 (log data indicating the situation such as decryption, installation, term of utilization etc.), situation of progress indicating history of progress (progress data indicating progress of a game etc.), situation of achievement of an event indicating the particular event is achieved (event data) etc. (these are the history of utilization of contents) are automatically transmitted at a predetermined timing while the user terminal 10 is connected with the monitoring server 30. The above timing is, for example, the time of booting the user terminal 10 or the time of activation of contents, or the time when a number of times of utilization of contents reaches a predetermined count, or the time of a termination process of the contents.

The digital information forms various configurations such as a program giving a predetermined function to the user terminal 10 by itself, a function recalling a function of a device such as the user terminal 10 etc., and data. Thus, because the digital information described above has a wide variety, this digital information is generically referred to as a middleware in this embodiment.

Figure 6:
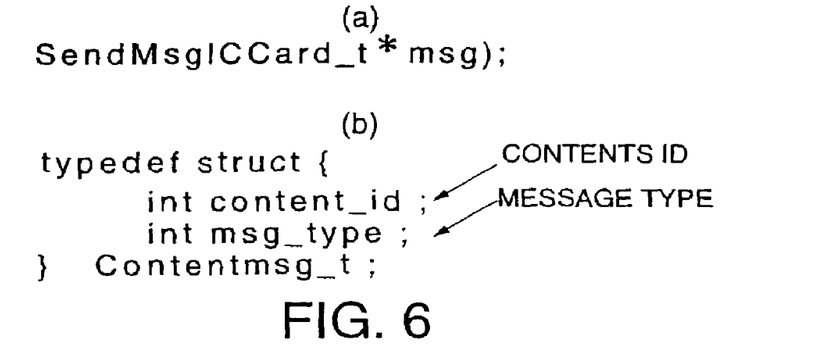
FIG. 6 is a diagram showing an example of description for recording a message in which a function of one example of a middleware is embedded, to the member card, wherein (a) represents an example of the function, and (b) represents an example of a parameter.

For example, in the case that the contents is a game program, the middleware has a function of embedding a message call (function and parameter) in the member card KC by recalling a library provided from the service manager. Such examples of the function are shown in FIG. 6. An example of the function is shown at (a), and an example of the parameter is shown at (b).

Figure 7:
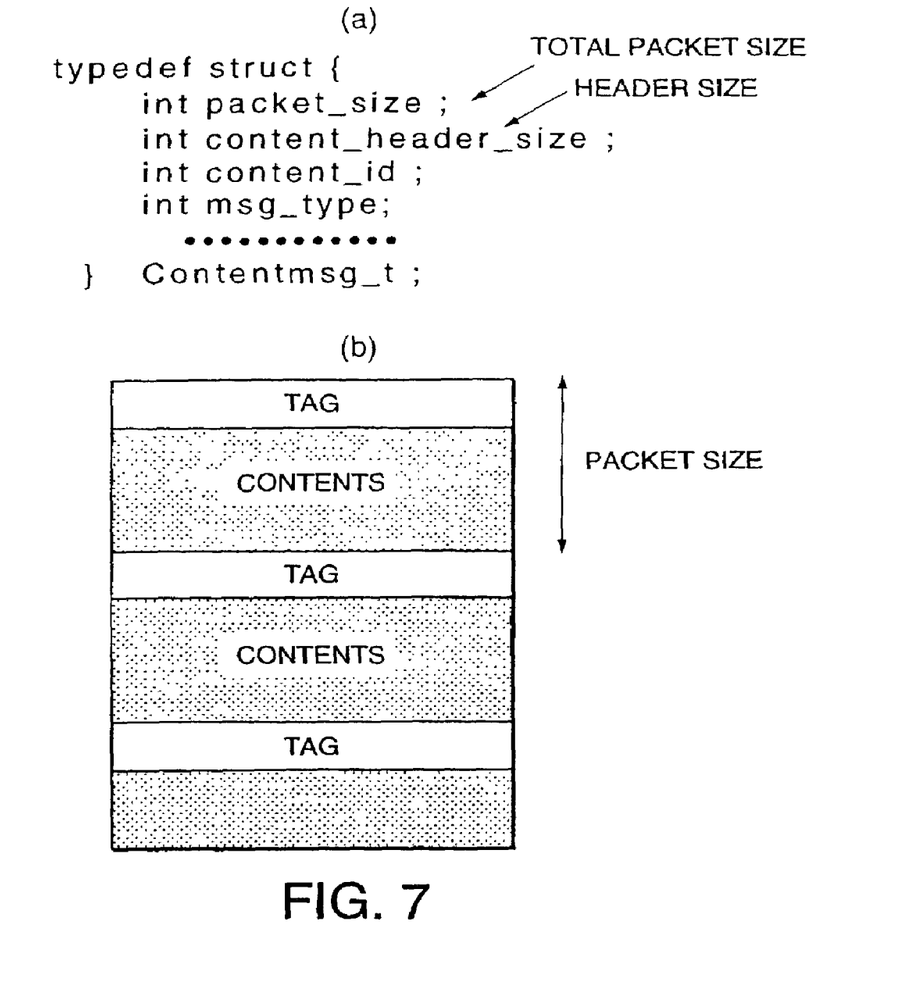

In the case that the contents is a kind of a data format such as a digitized image or music, a contents tag which can be interpreted by an decoder operating on the user terminal 10 is embedded in the top part of the contents as shown at (b) in FIG. 7. In FIG. 7, (a) shows a concrete example of such content tag. The user terminal 10 operates so as to record a message to the member card KC after viewing this contents tag.

Figure 8:
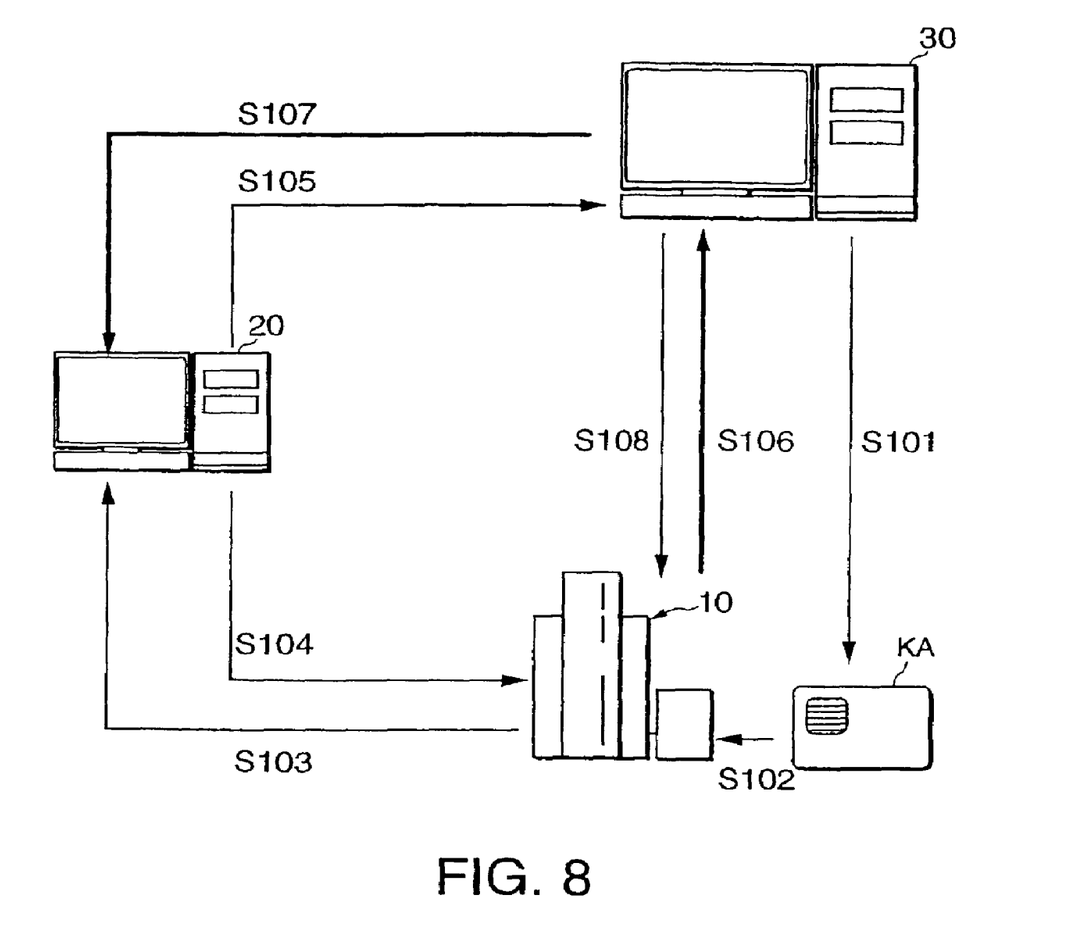
FIG. 8 is a block diagram showing procedures of one example of an operation mode according to the preferred embodiment of the present invention.

Assuming the above-described point, a total flow of operation will be described with reference to FIG. 8.

The user who is going to enjoy a benefit gained by utilization of contents takes the procedures of a member registration through the monitoring server 30. On the member registration, the user inputs user's name, street address, contact address, and a serial number of the user terminal in use.

After the member registration is properly performed through the monitoring server 30, the service manager issues the member card KC in which the user ID, the terminal ID, and the decryption key necessary for utilization of contents etc. are recorded (Step S101).

The user loads this member card KC to the user terminal 10 operated by him/herself (Step S102). The user sends a request for contents distribution to any of the information service servers 20 beforehand or after receiving the member card KC (Step S103). After receiving the request, the information service server 20 distributes to the user the contents with the above-described middleware embedded, while the information service server 20 informs the monitoring server 30 of the user as a distribution destination, the contents, the history of distribution, and the status of giving/receiving money, etc (Step S104). The monitoring server 30 stores this information in the master DB 34.

The user loads the contents to the user terminal 10 while the member card KC is loaded to the user terminal 10, and the user utilize this contents.

Prior to utilization of contents, the authentication function part of the member card KC and the main control portion 13 of the user terminal 10 jointly execute an authentication. This authentication is basically the user authentication, and this user authentication is executed whether the user is the pre-registered member or not, by determining whether the user ID or the user's name recorded in the member card KC coincides with the user ID or the user's name included in the attribute data of the contents or not. And only when these data coincide with each other, the decryption key is allowed to be utilized. To authenticate more strictly, further determination may be executed whether the contents is transacted properly or not. This determination can be executed by determining whether the history of transaction recorded in the member card KC coincides with the history of transaction included in the above attribute data or not. If the available user terminal 10 must be restricted to the pre-registered one, it is preferable to record the terminal ID in the attribute data of the contents and to record the terminal ID in the member card KC.

If the authentication is validated, then the contents are allowed to be utilized. And, after the contents is allowed to be utilized, the middleware embedded in this contents let the user terminal 10 communicate with the member card KC at the timing predetermined at the time of creation of the contents, and let the history of utilization of contents store in the data recording area of the member card KC (Step S105).

The history of utilization of contents in this embodiment is not a single history recorded at a time of transaction of contents, a time of decryption, or a time of installation as conventionally used, but is stored permanently as long as the contents is utilized.

For example, if the target contents is a game program (contents ID: C0001), and the user (user ID: 12345) plays this contents on the day yy/zz/xx (xx: year, yy: month, zz: day) using user's user terminal 10 (terminal ID: 54321), the log data indicating the condition of utilization in the history of utilization of contents is described as follows:
"User ID: 12345
Terminal ID: 54321
Contents ID: C001
Playing Date: yy/zz/xx"

Such log data is generated as long as the user plays these contents.

Also, if the contents is already archived and encrypted, the user terminal 10 installs this contents in the local storage device 11 through decrypting the contents using the decryption key in the member card KC. At the installation of the contents, a digital key necessary for an activation of the contents and the property described in the contents archive are recorded in the member key KC. In this case, the history of utilization of contents is an installation log indicating the date of installation and the property of the contents (variety and so on). After that, the user terminal 10 activates the contents with the member card KC loaded to the user terminal 10, and perfectly decrypts and executes the contents in the local storage device 11 while inquiring the recorded information of the member card KC as needed. In the member card KC the fact of activating contents, message to the member card KC etc. are recorded successively.

Because the operation described above is executed in the background independent of utilization of contents, the user cannot suspect the procedure.

The middleware transmit the stored log data to the monitoring server 30 via the user terminal 10 as needed, on the basis of a confirmation that the user terminal 10 is connected with the internet L (Step S106).

The monitoring server 30 classifies the transmitted information based on the detail of the information, and let the transmitted information store in the corresponding master of the master DB 34. After that, the monitoring server 30 generates a variety of information of utilization described above at a proper timing, based on the information stored in the master DB 34, and distributes the variety of information of utilization to the contents distributor and the user. In the case that the information of utilization is distributed online, this information of utilization is distributed to the contents distributor and the user along with the predetermined message. Moreover, the monitoring server 30 executes charging operation periodically, and distributes the first charge information to the user and the second charge information to the contents distributor (Step S107, S108).

As described above, in the contents distribution system according to the preferred embodiment, the monitoring server 30 for collecting information is equipped on the internet L which every user terminals utilizing contents can connect to, and the contents is distributed to the user terminal 10 with the middleware for transmitting the history of utilization of contents to the monitoring server 30 embedded in the contents at the time of creation of contents, and the monitoring server 30 generates the information of utilization indicating how much the particular contents is utilized based on the collected history of utilization of contents. Thus, one can monitor the utilizing condition of contents without spoiling the versatility of the operation of the user terminal, and without subsequently identifying the destination of distribution of the program etc. before transmitting the program. Moreover, since it is sufficient to embed the middleware per each content to the contents in order to achieve the necessary function on the user terminal 10 in response to the demand, the flexible response can be accomplished even if the type or the distribution mode of the contents varies widely.

And, according to the preferred embodiment, since the member card KC is issued to manage the personal information in conjunction with other information, it is easy to execute the operation of charging and settlement toward the user. Furthermore, since the utilization condition of contents per each user can be figured out, a variety of analyzing results such as user's preference can be offered as service information.

Moreover, since all of the information necessary for charging operation are collected and stored in the database (master DB 34) automatically, in other words, without manpower, the operation cost of the total system can be restrained to a lower level. This cost reduction leads to the reflection in terms of discount to the side of the customer of those services.

With regard to the copyright problems, since the utilization condition of the contents can be grasped successively, this system has an advantage that it is easy and accurate to calculate and collect royalties.

MODIFICATION OF THE PREFERRED EMBODIMENT

While the present invention has been described in terms of the preferred embodiment and the modifications thereof, the invention is not to be limited thereto, but can be embodied in various ways without departing from the principle of the invention as defined in the appended claims. For example, in the preferred embodiment described above, the necessary information is transmitted/received via the internet L at the time of online operation. On the other hand, it may be arranged that the system can be operated via the network other than the internet. Moreover, it may also be arranged that the contents can be dealt offline by recording the contents in a portable recording medium such as CD-ROM, DVD-ROM etc. while the contents is dealt online to record the recording medium such as HDD etc. of the client terminal 10. In the recording medium, the contents recording area in which the contents is recorded and the exclusive area in which the above-described middleware operated in cooperation with the contents is recorded, are generated. The transaction history data recording area may be generated in which the data of transaction history is recorded, when necessary. This area is generated at the position accessible at the time of booting or rebooting. With this arrangement, it is possible to determine properness of the contents before reading out these contents.

As described above, according to the present invention, a system can be provided in which the utilizing condition of contents to be distributed can be monitored properly, permanently and at a low cost.

What is claimed is:

1. A method executed in a computer system for monitoring a utilization condition of contents, wherein said computer system is provided on a network to which a user terminal is allowed to connect, said user terminal carrying out information processing by utilizing said contents, comprising the steps of:
   equipping information gathering means on the network;
   registering authentication information on a database;
   embedding digital information in said contents, said digital information itself causing said user terminal to automatically transmit a contents utilizing history indicating a utilizing condition of the contents to said information gathering means at a predetermined timing;
   distributing said contents to said user terminal, wherein said user terminal includes a memory medium in which authentication information identical to said registered authentication information is included, and wherein said terminal is authenticated by said authentication information in the memory medium;
   gathering, according to the digital information included in the distributed contents, said contents utilizing history via said information gathering means which is automatically transmitted from the user terminal;
   recording the gathered contents utilizing history, in correspondence with said registered authentication information, in the database; and
   creating utilizing information indicating how much the particular content is utilized, based on recorded data in the database.

2. A method for monitoring a utilization condition of contents according to claim 1, further comprising the step of authenticating whether said user terminal and said contents utilized in said user terminal are proper or not, based on registered history data of transaction indicating that said contents are properly transacted, and also based on registered user terminal identification data for authentication.

3. A method for monitoring a utilization condition of contents according to claim 2, wherein said authenticating step is executed on said user terminal to which said recording medium is loaded, by recording said user terminal identification data to said data recording area of the recording medium and distributing said history data of transaction along with said contents.

4. A method for monitoring a utilization condition of contents according to claim 1, wherein said user terminal transmits said contents utilizing history to said information gathering means, on condition that the number of times of utilizing the same content by the same user exceeds a predetermined number.

5. A system for monitoring a utilization condition of contents, wherein said system is provided on a network to which a user terminal and a computer are allowed to connect and includes information gathering means having a mechanism for gathering information from the network, said user terminal carrying out information processing by utilizing said contents, said computer distributing the contents to said user terminal and comprising:
   register means for registering authentication information on a database;
   issuing means for issuing authentication information identical to said registered authentication information to a memory medium which is allowed to connect to the user terminal;
   embedding means for embedding digital information in said contents, said digital information triggering said user terminal to automatically transmit a contents utilizing history indicating a utilizing condition of the contents to said information gathering means at a predetermined timing;
   distributing means for distributing said contents to said user terminal wherein said user terminal includes a memory medium in which authentication data identical to said registered authentication information is included, and wherein said user terminal is authenticated by said authentication information in the memory medium;
   recording means for recording the contents utilizing history in correspondence with the registered authentication information, said recording means gathering the contents utilizing the contents utilizing history via the information gathering means on the network, said contents utilizing history being automatically transmitted from the user terminal according to the digital information included in the distributed contents; and
   creating means for creating utilizing information indicating how much the particular content is utilized, based on recorded data in the database.

6. The method for monitoring a utilization condition of contents according to claim 1, wherein said digital information comprises data and a function for recalling a function of the user terminal or a function of a device connected to the user terminal.

7. The method for monitoring a utilization condition of contents according to claim 1, wherein said user terminal transmits said contents utilizing history to said information gathering means, on condition that a number of times of utilizing a same content by a same user exceeds a predetermined number.

8. A computer system connectable to a network with which a user terminal for executing information processing by utilizing contents is allowed to connect, said computer system including a computer program for operating said computer system as a utilizing condition monitoring system for monitoring utilizing condition of the contents by said user terminal, said computer system including an information gathering means for gathering information from said network, said computer program causing said utilizing condition monitoring system to comprise:

register means for registering authentication information on a database;

issuing means for issuing authentication information identical to said registered authentication information to a memory medium which is allowed to connect to the user terminal;

embedding means for embedding digital information in said contents, said digital information triggering said user terminal to automatically transmit a contents utilizing history indicating a utilizing condition of the contents to said information gathering means at a predetermined timing;

distributing means for distributing said contents to said user terminal wherein said user terminal includes a memory medium in which authentication data identical to said registered authentication information is included, and wherein said user terminal is authenticated by said authentication information in the memory medium;

recording means for recording the contents utilizing history in correspondence with the registered authentication information, said recording means gathering the contents utilizing the contents utilizing history via the information gathering means on the network, said contents utilizing history being automatically transmitted from the user terminal according to the digital information included in the distributed contents; and creating means for creating utilizing information indicating how much the particular content is utilized, based on recorded data in the database.

9. A recording medium readable by a user terminal which executes information processing by utilizing contents and is accessible to information gathering means equipped on a network, said recording medium comprising:

a contents recording area in which said contents are recorded and a digital information recording area in which digital information associated with said contents is recorded, wherein said digital information is extracted from said contents by said user terminal for recording in the digital information recording area and triggers said user terminal to store a contents utilizing history indicating a utilizing condition of the contents in a given recording area of the recording medium, and to read said stored contents utilizing history so as to transmit according to said digital information said contents utilizing history to said information gathering means at a predetermined timing while said user terminal is connected with said network.

* * * * *